April 28, 1970     G. A. NOBLE ET AL     3,509,311

RESISTANCE WELDER MONITOR CIRCUIT

Filed Dec. 11, 1967     3 Sheets-Sheet 1

INVENTORS
Gardiner A. Noble
Roland J. LeBlanc
BY
Harness, Talburtt & Baldwin
ATTORNEYS

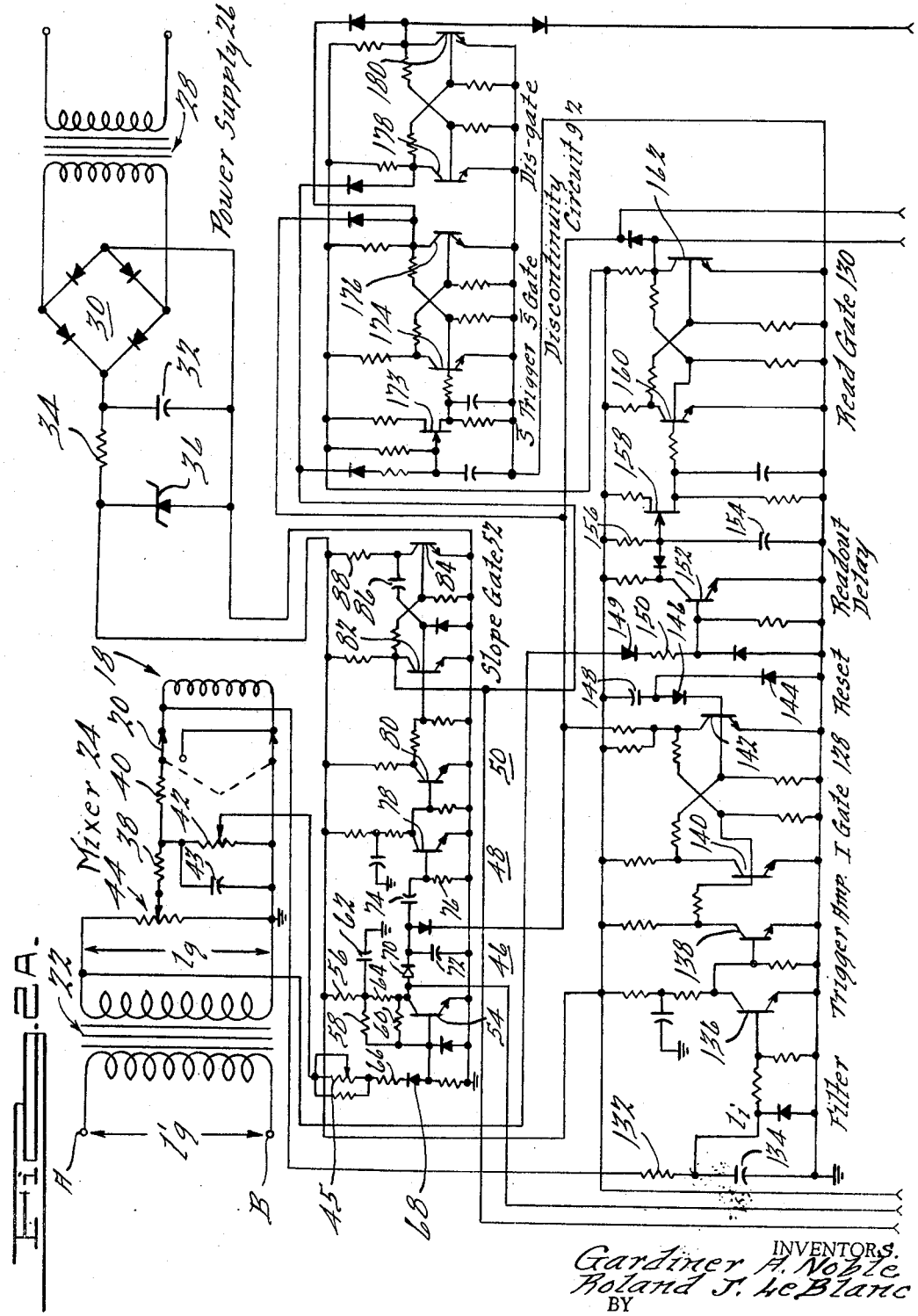

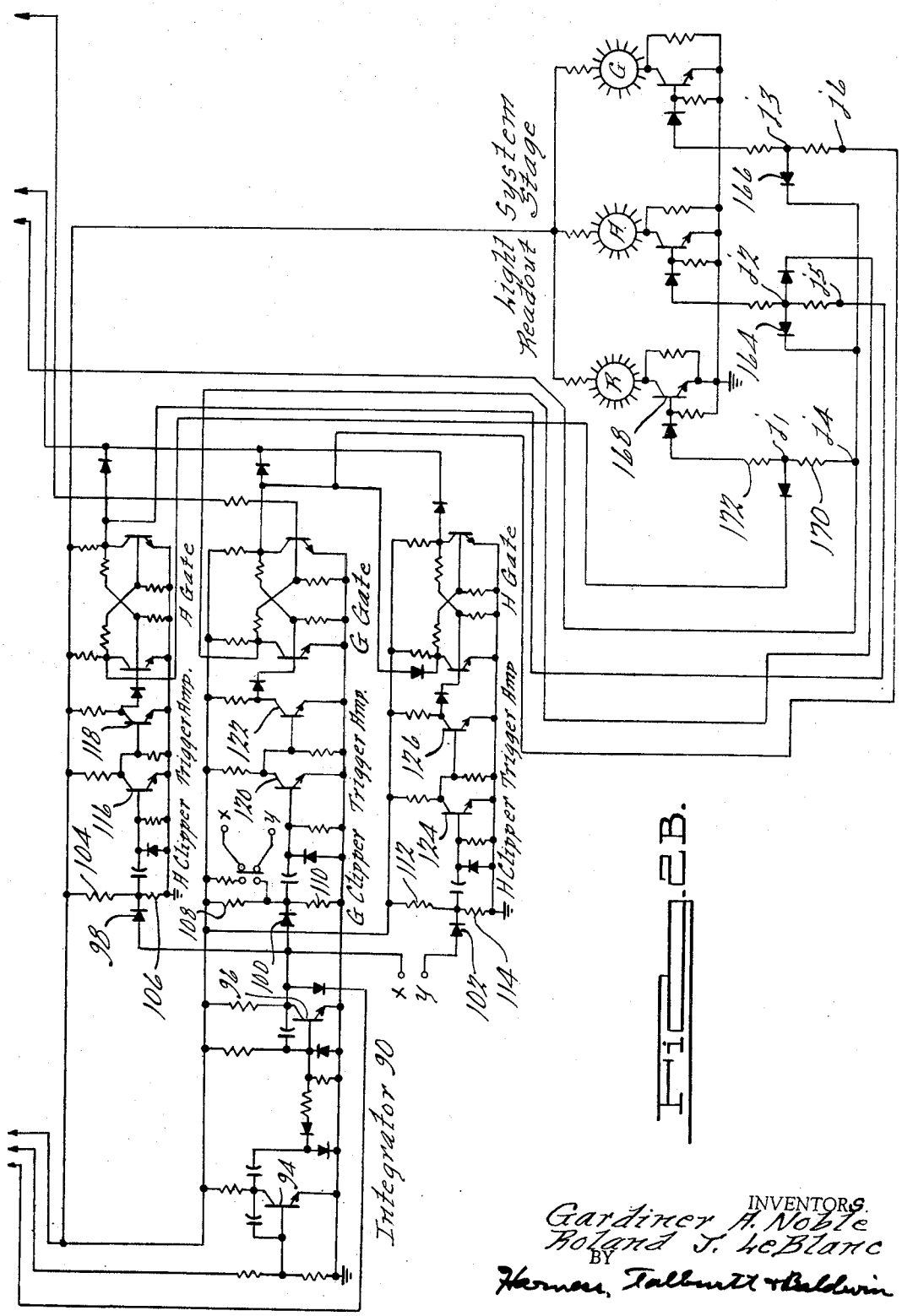

United States Patent Office 3,509,311
Patented Apr. 28, 1970

3,509,311
RESISTANCE WELDER MONITOR CIRCUIT
Gardiner A. Noble, Farmington, and Roland J. Le Blanc, Westland, Mich., assignors to Chrysler Corporation, Highland Park, Mich., a corporation of Delaware
Continuation-in-part of application Ser. No. 312,760, Sept. 30, 1963. This application Dec. 11, 1967, Ser. No. 689,638
Int. Cl. B23k 11/24
U.S. Cl. 219—109   6 Claims

ABSTRACT OF THE DISCLOSURE

In determining the acceptability of a weld, first and second means are used to produce a signal representative of the time after the beginning of a weld period that a positive voltage inflection point occurs and the magnitude of the voltage at that point. The signals are then combined by a signal mixer to provide an output signal which is proportional to the weld power density and which is translated into an indication of weld quality. A means is also provided to detect the slope of the voltage curve extending over the peaks of the voltage cycles following the inflection point which is then occurring. If the extent of the curve is greater than three succeeding cycles, the indicater will not indicate an acceptable weld. This is in anticipation of another positive slope leading to a second inflection point.

CROSS REFERENCE TO RELATED APPLICATION

This application is a continuation-in-part of Gardiner A. Noble application Ser. No. 312,760, filed Sept. 30, 1963, entitled, "Weld Control Circuit" and now U.S. Patent No. 3,358,116.

BACKGROUND OF THE INVENTION

The field to which our invention relates is that of resistance welding. The monitor circuit is for the purpose of controlling weld quality. By "weld quality" we have reference to the deviation of weld nugget size and shape from a predetermined standard for the particular work application at hand. The initial assumption made was that the temperature forming the weld nugget, i.e., the melting of rolled steel to a cast structure between two sheets of weld material is related to electrical weld power density. By "power density" is meant the power at the work divided by the tip area of one of the electrodes employed in the welding. The second assumption is that nugget size and shape which determines weld quality are related to power density. With these two assumptions in mind, we undertook to find and develop a function related to power density and to develop a monitor circuit making use of this function. The specific embodiment of our invention derives and develops an output control signal and uses it to indicate weld quality by a visual system employing three lights. The output control signal provided by our inventive circuit might equally well be employed to interrupt the power source from the load or actively control welding current from the source after the manner known to those skilled in the art. Reference is hereby made to Noble Patent 3,358,116 issued on Dec. 12, 1967 for one type of appropriate power control circuit. Our resistance welder monitor system properly used has the capability of deciding tip dressing and tip changing as well as indicating the general level of weld quality being obtained.

BRIEF DESCRIPTION OF THE DRAWINGS

FIGURES 2A and 2B are a combined schematic drawing showing the monitor circuit and indicator system with common junction terminals indicated.

DESCRIPTION

Figure 1:
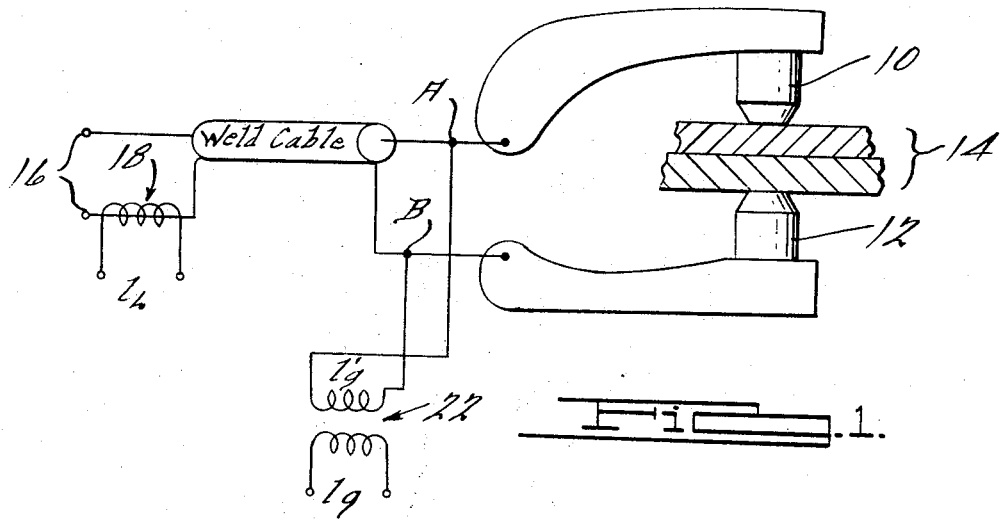
FIGURE 1 is a combined schematic diagrammatic showing of a basic resistance welder circuit with the sensing devices used in connection with our invention.

FIGURE 1 shows the basic elements of a resistance welder which includes upper and lower electrodes 10 and 12. The weld material between the welding jaws is denoted by the numeral 14. The welder receives welding impulses of alternating current from a weld power transformer secondary across terminals 16. The welding power input is controlled with respect to a predetermined timing sequence through the progressive steps of squeeze, weld, hold and off stages by a welding time sequence control circuit such as is well known in the welding art. In the present circuit, two sensing devices are used in the monitor circuit. An air core toroid 18 is wrapped about one-half the welding power transformer secondary. The voltage $1_L$ is a function of the mutual inductance between coil 18 and the conduit it is wrapped around and the rate of change of welding current passing through the conduit. Sensing coil 18 has its terminals connected to phase switch 20 in FIGURE 2A.

A second voltage sensor is connected across the welder jaws as shown. This sensor comprises transformer 22 having its terminals A, B connected as shown and having a voltage $1'_g$ across its primary terminals. Transformer 22 has a step-up winding ratio to provide a voltage $1_g$ across its secondary. Voltage $1'_g$ is proportional to the sum of the instantaneous voltages that appear across the welder jaws, tips and work. The outputs $1_L$ and $1_g$ from the sensors of the welding circuit are provided as inputs to the mixer 24 of FIGURE 2A.

With more particular reference to FIGURE 2A, that drawing shows the upper portion of the welding monitor circuit with the lower half being shown in FIGURE 2B. The regulated power supply 26 for the circuit includes AC input transformer 28, rectifier 30, capacitor 32, series resistor 34, and Zener diode 36.

Mixer 24 includes summing resistors 38, 40, 42, with shunt capacitor 43 connected as shown. Null-adjust potentiometer 44 is connected as shown with its variable resistance adjusted to provide a minimum difference voltage across resistor 42 when the welder jaws are positioned across the work.

It will thus be seen that since the capacitance in the welder jaw circuit is negligible and the inductance and resistance are predominant, the voltage $1_g$ comprises resistive and inductive components. The voltage $1_L$ is directly related to the inductive component since it derived from the series current circuit. The output of mixer 24 is consequently purely resistive in nature and directly related to the resistance in the welder jaw circuit. The resistance of the work is much greater in magnitude than the tip and jaw resistances so that only the former need to be considered. It should be understood that the resistance of the work includes the outerfaces as well as the interface in addition to the work thickness and shape. The formula for the output of mixer 24 may be written as follows:

$$\text{Mixer output} = 1_g - 1_L$$
$$\alpha 1'_R$$
$$= 1_R$$

wherein the term $1'_R$ is the actual work resistance and $1_R$ is proportional thereto.

The voltage $1_R$ appearing across resistor 42 is substantially sinusoidal at 60 cycles per second frequency and within approximately one volt amplitude with the level adjustable by resistors 42 and 45. In one exemplary embodiment of this invention the weld cycle duration equalled sixteen cycles.

The next following stages from mixer 24 are clipper amplifier 46, slope detector 48, trigger amplifier 50 and slope gate 52. Clipper amplifier stage 46 includes transistor 54 which is biased and coupled as shown. Transistor 54 is operated Class C and is normally held "ON." Bias resistors 56, 58 and 60 are connected as shown with capacitor 62 connected between the junction of resistors 56, 58 and ground. Load resistor 64 is connected in series with the collector of transistor 54. Signal input to the base of transistor 54 is through the series network comprising resistor 66, diode 68. The clipper amplifier stage removes approximately 80 percent of the $1_R$ level from zero and the voltage waveform above this fixed point—20 percent or more—is amplified.

The next stage comprises slope detector 48 which includes diode 70, capacitor 72, capacitor 74 and resistor 76. Operation of the circuit will be considered first without reference to the amplifier transistor 78 stage next following. Capacitor 72 will be charged through diode 70 to the peak voltage of the first cycle since the time constant of resistor 64, the load resistor for transistor 54, and capacitor 72 is sufficiently small for 60 c.p.s. operation. The magnitude of capacitor 72 is about ten times greater than that of capacitor 74 even if resistor 76 is equal to zero such that the voltage across capacitor 72 is dependent for practical purposes only on capacitor 72. The discharge path for capacitor 72 is through resistor 76 and capacitor 74 which is practically insignicant for the time between pulses at a 60 c.p.s. frequency. The result is that the peak level of the first pulse is stored by capacitor 72. The second cycle must be larger in peak voltage level if diode 70 is in conduct.

Figure 3:
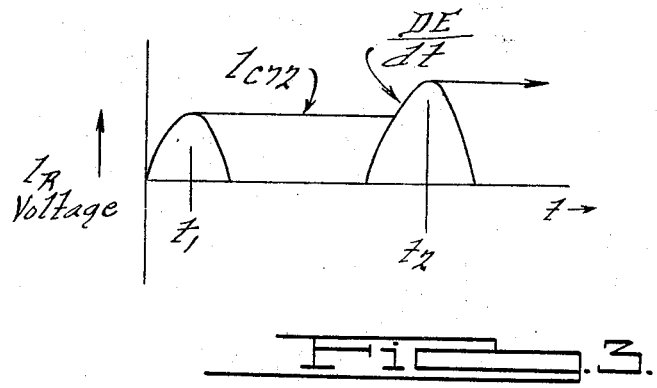
FIGURE 3 is a graph of welding voltage plotted on a time scale.

Reference is now made to FIGURE 3 which shows the voltage output waveform of slope detector stage 48, i.e., the voltage across resistor 76. The voltage shown on the ordinate scale represents voltage $1_R$, the voltage signal output of mixer stage 24 which signal is proportioned to the actual work resistance. The inflection point is indicated on the drawing of FIGURE 3 as $dE/dt$. A normal welding cycle will fall between $T_1$ and $T_2$ on the abscissa. If the weld cycle is at 60 c.p.s., then $$60 \text{ c.p.s.} = \frac{1}{T_1 - T_2}$$

The output of slope detector 48 may be expressed as follows:

$$1_{R76} = \frac{(C74R76X_{C74})}{(X_{C74} + R76)} \frac{dV_{C72}}{dt}$$

$$1_{R76} = K \frac{dV_{C72}}{dt}$$

wherein the connection of transistor 78 alters the constant K. In the above formula, all voltages indicated are peak voltage values.

The voltage differentials are amplified by transistors 78 and 80 of amplifier stage 50 annd used to trigger slope gate 52. Slope gate 52 comprises transistors 82 and 84 biased and coupled as a monostable multivibrator. The time constant determined by the magnitude of capacitor 86 and resistor 88 is such that the monostable multivibrator will reset at approximately 0.7 $(T_2-T_1)$ with reference to FIGURE 3. An output signal is taken from the collector of transistor 82 and is used as a gate signal to a following integrator stage 90 of FIGURE 2B and to weld discontinuity circuit 92. Therefore, for example, in a typically good weld with an inflection point on the fifth cycle there will be five square wave gating pulses on the collector of slope gate transistor 82.

The output of clipper amplifier stage 46 that is the $I_{Rm}$ signal on the collector of transistor 54 is also fed to integrator stage 90 which stage includes transistors 94 and 96. Transistors 94 and 96 are connected in standard operational amplifier circuits and the output of transistor 96 may be expressed as follows:

$$1_q = \int_{t_i}^{t} \int_{0}^{t} 1_{Rm}(dt^2)$$

wherein:

$1_q$ = the "quality" signal voltage
$1_{Rm}$ = the modulated portion of the derived signal from mixer 24
$t_1$ = the time of the trailing edge of the last slope gating pulse which occurs approximately $.7(t_2-t_1)$ after the inflection point.

The output signal of integrator stage 90 is taken from the collector of transistor 96 annd passed through diodes 98, 100 and 102 to their respective voltage level clippers. Resistors 104, 106 from a voltage divider to control the conduction level of diode 98. Resistors 108, 110 form a voltage divider to control the conduction level of diode 100. Resistors 112 and 114 set the conduction level of diode 102. In this manner, the sampling levels for the quality voltage signal $1_q$ are set independent of the following trigger amplifier gains. Amplifier transistors 116, 118 are used to operate the A gate, transistors 120, 122, the G gate and transistors 124, 126, the H gate. The A, G and H gates are standard Eccles Jordan trigger circuits.

Other essential stages in the welder monitor circuit of FIGURE 2A are I-gate 128 and read gate 130 which control the sequence of information. I-gate 128 includes a filter input stage including resistor 132 and capacitor 134. The toroid 18 voltage derived as shown in FIGURE 1 is fed into resistor 132 and capacitor 134 to provide a voltage $1_i$ across capacitor 134 which voltage is the approximate integral of $1_L$. The $1_i$ voltage is proportional to the weld current level in the welder. Amplifier stage transistors 136, 138 amplify the positive half of the $1_i$ signal to operate the I-gate 128. I-gate 128 includes transistors 140, 142 biased and coupled as a standard bistable multivibrator. Reset for the I-gate is provided by the network including diodes 144, 146 and capacitor 148. It will be seen that when power supply 26 is turned on, capacitor 148 is charged through diode 146 and the base of transistor 142 thus turning it on. When the supply voltage is turned off, capacitor 148 is discharged through diode 144. The I-gate has two functions—to discharge the slope detector capacitor 72 and to reset the other gates. When the weld current is turned on, the I-gate becomes triggered by transistor 138 so that transistor 142 is turned off. This turn-off of transistor 142 occurs within several degrees of the initial positive current alternations of the first cycle. At this time, the clamps are removed from the several gates and from capacitor 72 and the information sequence is enabled.

During the information sequence, the tip voltage signal $1_g$ from transformer 22 passes through diode 149, resistor 150 and turns on transistor 152 at a 60 cycle rate on the positive half cycles of $1_g$. Capacitor 154 is thus repeatedly discharged during the weld cycle. Unijunction transistor 158 does not fire during the weld cycle since the time constant of capacitor 154 and resistor 156 is such that it will fire at a time somewhat larger than the period $(T_2-T_1)$ as shown in FIGURE 3 and after the last cycle of weld time.

When unijunction transistor 158 turns on, Read gate 130 is turned on. Read gate 130 comprises transistors 160, 162 biased and coupled as a standard bi-stable multivibrator. During weld time, the collector of transistor 162 is at ground potential keeping junctions $j_2$, $j_3$ and $j_4$ in the light system readout stage at ground potential directly and through diodes 164 or 166. Thus, during the weld cycle time, the light system readout is inhibited while Integrator 90 and Discontinuity Circuit 92 are reaching a decision on weld quality.

At the end of weld time, read-gate 130 will turn on transistor 168 through resistors 170 and 172 if the A-gate was not turned on to remove the inhibitor clamp at junction $j_1$. Otherwise stated, if the quality voltage $1_q$ furnished to the collector of transistor 96 in Integrator 90 is not sufficient to exceed the A-clip level by approximately a volt, then the A-gate is not switched to its other state, junction $j_1$ is not dropped to ground level and the read-gate will fire the red light R. The following are clip levels for the several light signal outputs used in one exemplary embodiment of our invention:

CLIP LEVEL

R (Red)—0–5 volts
A (Amber)—5–7 and 12–25 volts
G (Green)—7–12, x–y switch set 9 volts With the above clip level values, the quality voltage $1_q$ on the collector of transistor 96 must be in excess of seven volts or the read-gate 130 will fire the red light. Junctions $j_5$, $j_6$ will remain at ground potential since their respective gates have not been fired.

The discontinuity circuit of FIGURE 2A includes the $\bar{s}$ trigger including unijunction transistor 173, the $\bar{s}$ gate including transistors 174, 176 and the Dis-gate including transistors 178, 180. Unijunction transistor 173 and its associated RC timing circuit are used to measure the time slightly greater than three full cycles of 60 c.p.s. $1_R$ voltage past the first inflection point as is indicated in FIGURE 3. This is in anticipation of another positive slope leading to a second inflection point on the $1_{Rm}$ curve. If there exists on the $1_{Rm}$ curve a negative time rate of change or slope extending over at least three cycles or more, then the unijunction transistor 173 will fire changing the state of the $\bar{s}$ gate which will not signify a satisfactory weld. This would be the case as indicated by the substantially zero slope indicated at $t_2$ in FIG. 3. This allows the Dis-gate to change state only if another slope gate pulse occurs in the waveform of $1_{Rm}$.

DESCRIPTION OF OPERATION

The voltage $1_R$ across resistor 42 of FIGURE 2A is approximately sinusoidal at 60 cycles per second frequency and within a volt amplitude or so. This desired level is adjustable through resistors 42 and 44. In the particular work application where this monitor was used, the weld cycle duration equalled 16 cycles. There is an amplitude modulation on $1_R$ of between 15% to 25% depending on the welding job being done. In a typically good weld, there is a single inflection point in the $1_R$ modulation. Also, the position of the inflection point, that is, on which of the 16 cycles it occurs as well as the amplitude determines the average power density level which we have found is directly related to weld quality. Thus, Average Power Density $A_i/N_i T_i$ wherein:
$A_i$ is the amplitude of $1_R$ at the inflection point,
$T_i$ is the time from the beginning of the weld cycle ($t=o$) of this inflection point
$N_i$ is the number of inflections or the discontinuity figure.

Therefore, in the above equation, a typically good weld will have a high amplitude inflection point that will occur between the fourth and sixth cycle depending on the application and have a single inflection point. The above equation is used for purposes of explanation and does not necessarily imply a linear relationship between these variables. The actual relationships between these variables are not understood with sufficient clarity to give a detailed mathematical treatment.

This monitor circuit has been used on welds of mild steel to mild steel, galvanize to galvanize and mild steel to galvanize in any desired combination. The specific embodiment used was designed and used in a 1:4, 1:5 (galvanize to galvanize):(galvanize to mild steel) welding combination, respectively. The material thicknesses are of 0.060 inch and 0.075 inch per sheet. The modulation due to the nature of the work is somewhat constant and is a fingerprint type of response. In this manner, it is a constant but in relation to the life history of a pair of welding tips, it is not. The modulation varies in a quite specific manner throughout tip life. However, the above Average Power Density equation still holds in all types of work regardless of different tip-life responses for different kinds of work.

To simplify the description of operation, it will be made with reference to the following logic table:

LOGIC TABLE—GATES AND RESPECTIVE LIGHTS

| Events | A | G | H | R | D | Light system outcome |
|---|---|---|---|---|---|---|
| 1 | 0 | 0 | 0 | 1 | 0 | Red. |
| 2 | 0 | 0 | 0 | 1 | 1 | Red. |
| 3 | 1 | 0 | 0 | 0 | 0 | Amber. |
| 4 | 1 | 0 | 0 | 0 | 1 | Amber. |
| 5 | 1 | 1 | 0 | 0 | 0 | Green. |
| 6 | 1 | 0 | 1 | 0 | 1 | Amber. |
| 7 | 1 | 0 | 1 | 0 | 0 | Amber. | wherein:
O means that the gate and associated light, if any, are not turned on.
I means the gate is turned on.
A, the A-gate
G, the G-gate
H, the H-gate
R, the Read gate
D, the Dis-gate.

In operation of the monitor circuit, only events 1 through 6 occurred. The happening of events 1 and 2 with red light indication was the basis for a decision to change the welding tips. Events 3, 4 and 6 were the basis for a decision to dress the welding tips when their occurrence was sufficiently numerous and not due to bad workmanship. Examples of what is meant by bad workmanship are severe edge welds, complete misses (single sheet), double or triple hits on the same weld, moving the tips from their normally perpendicular position during weld time, welding on raised protuberances and the like. Event 7 was anticipated by laboratory testing where the inflection point in the $1_R$ modulation curve was found to have an optimum value. Above this value indicates a high resistance due to excessive tip contamination. The set-up procedure for the monitor circuit is relatively simple. However, the quality voltage levels $1_q$, that is, the A, G and H levels may have to be readjusted for different applications. The X–Y switch which serves to set the range over which the G-clip level was acceptable may also need to be recalibrated.

It will thus be seen that by our monitor circuit it is possible to determine general workmanship of welds being made. It is further possible to arrive at proper decisions relative to tip dressing and tip changing.

We claim:

1. The method of indicating the quality of a resistance type weld between a pair of weld electrodes comprising the steps of passing a predetermined number of current impulses across said electrodes in a weld cycle, sensing for the occurrence of a major positive electrode voltage inflection point during said cycle, deriving a first signal representative of the magnitude of voltage between said electrodes at said inflection point, deriving a second signal representative of the time after the beginning of said cycle said inflection point occurs during said cycle, and combining the aforesaid signals to provide an output signal which is a function of weld quality.

2. The method of indicating the quality of a resistance type weld between a pair of weld electrodes comprising the steps of passing a predetermined number of welding impulses across said electrodes in a weld cycle, sensing for the occurrence of an abrupt positive electrode voltage inflection point during said cycle, deriving a first electrical signal representative of voltage between said electrodes at said inflection point, deriving a second electrical signal representative of the time after the beginning of said cycle said inflection point occurs during said cycle, and combining the aforesaid signals to provide an output signal representative of weld quality.

3. The method of indicating the quality of a resistance type weld made between a pair of weld electrodes comprising the steps of applying a predetermined number of electrical impulses across said electrodes in a weld cycle, sensing for the occurrence of an abrupt electrode voltage rise during said cycle, deriving a first electrical signal representative of the magnitude of voltage across said electrodes at said rise, counting the number of pulses that have been applied to said electrodes before occurrence of said abrupt rise, deriving a second electrical signal which is a function thereof, and combining the aforesaid signals to provide an output signal representative of weld quality.

4. In an electrical resistance welder including a power supply for providing a predetermined number of electrical impulses across a pair of weld electrodes in a weld cycle, means for sensing the voltage across said electrodes during said cycle, means for detecting the occurrence of an abrupt positive inflection point of said voltage, means for providing a first signal representative of peak voltages at said point, means for providing a second signal representative of the time during said cycle said inflection point occurred, and means for combining said signals to provide an output signal representative of weld quality.

5. In an electrical resistance welder including a power supply for providing a predetermined number of electrical impulses in a weld cycle through a weld power transformer across a welding tool having a pair of electrodes, means for deriving a first voltage signal from one winding of said transformer comprising an air toroid pickup, means for deriving a second voltage signal across said welding tool, a mixer connected to receive and combine said first and second voltage signal means connected to the output of said mixer for detecting the occurrence of an abrupt positive inflection point thereof, means connected to the output of said mixer for providing a control signal representative of the time during said cycle said inflection point of the output voltage occurred and means coupled to said last-mentioned means for providing a visual signal representative of weld quality which is a function of said control signal.

6. The method of indicating the quality of a resistance type weld between a pair of weld electrodes comprising the steps of passing a predetermined number of welding impulses across said electrodes in a weld cycle, sensing across said electrodes for the occurrence of an abrupt change of electrode voltage of between fifteen and twenty-five percent, providing a first control voltage signal representative of the occurrence of said change, sensing the time during said cycle said abrupt change occurs, providing a second control voltage signal representative of said time, and combining the aforesaid signals to provide an output signal representative of weld quality.

References Cited

UNITED STATES PATENTS

| | | | |
|---|---|---|---|
| 2,024,542 | 12/1935 | Simon | 219—110 |
| 2,472,042 | 5/1949 | Davies | 219—110 |
| 2,508,330 | 5/1950 | Callender et al. | 219—110 |
| 3,345,493 | 10/1967 | Guettel et al. | 219—110 |

ANTHONY BARTIS, Primary Examiner

J. GREGORY SMITH, Assistant Examiner